(12) United States Patent
Fishwick et al.

(10) Patent No.: US 11,277,632 B2
(45) Date of Patent: Mar. 15, 2022

(54) MOTION ESTIMATION USING COLLOCATED BLOCKS

(71) Applicant: Imagination Technologies Limited, Kings Langley (GB)

(72) Inventors: Steven Fishwick, Kings Langley (GB); Jonathan Diggins, Hampshire (GB)

(73) Assignee: Imagination Technologies Limited, Kings Langley (GB)

( * ) Notice: Subject to any disclaimer, the term of this patent is extended or adjusted under 35 U.S.C. 154(b) by 893 days.

(21) Appl. No.: 15/176,727

(22) Filed: Jun. 8, 2016

(65) Prior Publication Data

US 2016/0360226 A1 Dec. 8, 2016

(30) Foreign Application Priority Data

Jun. 8, 2015 (GB) .................................... 1509889

(51) Int. Cl.
*H04N 19/52* (2014.01)
*H04N 19/553* (2014.01)
(Continued)

(52) U.S. Cl.
CPC ........... *H04N 19/52* (2014.11); *H04N 19/172* (2014.11); *H04N 19/176* (2014.11);
(Continued)

(58) Field of Classification Search
None
See application file for complete search history.

(56) References Cited

U.S. PATENT DOCUMENTS

| 9,106,926 B1* | 8/2015 | Li ......................... H04N 19/553 |
| 2006/0017843 A1* | 1/2006 | Shi ......................... H04N 5/145 |
| | | 348/441 |

(Continued)

FOREIGN PATENT DOCUMENTS

| CN | 101023677 A | 8/2007 |
| CN | 101179731 A | 5/2008 |

(Continued)

OTHER PUBLICATIONS

Choi et al; "New Frame Rate-Up-Conversion Using Bi-Directional Motion Estimation"; IEEE Transactions on Consumer Electronics, IEEE Service Center, New York, NY, US; vol. 46, No. 3, Aug. 1, 2000, pp. 603-609.

(Continued)

*Primary Examiner* — Michael J Hess
(74) *Attorney, Agent, or Firm* — Potomac Law Group, PLLC; Vincent M DeLuca

(57) ABSTRACT

A data processing system for performing motion estimation in a sequence of frames comprising first and second frames each divided into respective sets of blocks of pixels, the system comprising: a vector generator configured to form motion vector candidates representing mappings of pixels between the first and second frames; and a vector processor configured to, for a search block of the first frame, identify a first motion vector candidate ending in a block of the second frame collocated with the search block and form an output vector for the search block which is substantially parallel to the first motion vector candidate and represents a mapping of pixels from the search block to the second frame.

19 Claims, 8 Drawing Sheets

(51) Int. Cl.
- *H04N 19/56* (2014.01)
- *H04N 19/573* (2014.01)
- *H04N 19/557* (2014.01)
- *H04N 19/172* (2014.01)
- *H04N 19/176* (2014.01)
- *H04N 19/182* (2014.01)

(52) U.S. Cl.
CPC ......... *H04N 19/182* (2014.11); *H04N 19/553* (2014.11); *H04N 19/557* (2014.11); *H04N 19/56* (2014.11); *H04N 19/573* (2014.11)

(56) References Cited

U.S. PATENT DOCUMENTS

| | | | |
|---|---|---|---|
| 2008/0112631 A1 | 5/2008 | Huggett et al. | |
| 2008/0285650 A1* | 11/2008 | Chappalli | H04N 7/0132 375/240.16 |
| 2009/0147851 A1* | 6/2009 | Klein Gunnewiek | H04N 19/513 375/240.16 |
| 2010/0053451 A1 | 3/2010 | Seong et al. | |
| 2010/0177974 A1* | 7/2010 | Chen | H04N 5/145 382/236 |
| 2010/0283892 A1* | 11/2010 | Zhou | H04N 5/145 348/441 |
| 2011/0176013 A1 | 7/2011 | Robertson et al. | |
| 2011/0206124 A1 | 8/2011 | Morphet et al. | |
| 2011/0211128 A1* | 9/2011 | Petrides | H04N 5/144 348/699 |
| 2012/0033130 A1* | 2/2012 | Piek | H04N 19/132 348/441 |
| 2013/0101041 A1 | 4/2013 | Fishwick et al. | |
| 2013/0170551 A1* | 7/2013 | Liu | H04N 7/014 375/240.16 |
| 2014/0010307 A1* | 1/2014 | Gilmutdinov | H04N 7/0132 375/240.16 |
| 2015/0296102 A1* | 10/2015 | Fang | H04N 7/014 348/699 |
| 2015/0358636 A1* | 12/2015 | Lin | H04N 19/573 375/240.16 |
| 2017/0006284 A1* | 1/2017 | Gokhale | H04N 19/61 |

FOREIGN PATENT DOCUMENTS

| | | |
|---|---|---|
| EP | 1 592 248 A1 | 11/2005 |
| EP | 1 774 794 A1 | 4/2007 |
| EP | 1 774 795 A1 | 4/2007 |
| WO | 2006/012382 A1 | 2/2006 |
| WO | 2006/012428 A1 | 2/2006 |
| WO | 2014106435 A1 | 7/2014 |

OTHER PUBLICATIONS

Haan et al: "True-Motion Estimation With 3-D Recursive Search Block Matching", IEEE Transactions on Circuits and Systems for Video Technology, IEEE Service Center, Piscataway, NJ, US, vol. 3, No. 5, Oct. 1, 1993 (Oct. 1, 1993), pp. 368-379.

Lin et al: "Motion vector coding techniques for HEVC", Multimedia Signal Processing (MMSP), 2011 IEEE 13th International Workshop on, IEEE, Oct. 17, 2011 (Oct. 17, 2011), pp. 1-6.

Lin, "Motion Vector Coding Techniques for HEVC," 2011 IEEE 13th International Workshop on Multimedia Signal Processing, Oct. 19, 2011.

Office action dated Mar. 26, 2021, CIPA Application No. 201610589660.7.

* cited by examiner

MOTION ESTIMATION USING COLLOCATED BLOCKS

BACKGROUND OF THE INVENTION

This invention relates to a method and data processing system for performing motion estimation in a sequence of frames.

In systems for handling video streams or other sequences of frames it is useful to be able to estimate the motion of features depicted in the stream between frames. Such motion estimation information has a variety of uses. For example, in a playback device, motion estimation information can be used to guess where features will be at a point in time between video frames and hence enable frame rate conversion through the generation of one or more interpolated frames between the frames of a video stream. In recording or encoding devices, motion estimation information allows efficient compression of a video stream since it is possible to, over a period of one or more video frames, replace the pixels representing the same feature in multiple video frames with a compressed description of the pixels and information describing the movement of those pixels between frames.

Various techniques for estimating the motion of pixels or groups of pixels between video frames are known. One common method, known as block based motion estimation, will now be described by way of example. Block based motion estimation subdivides frames of a video sequence into multiple regions known as blocks or macroblocks. Generally speaking, in order to identify the motion of a block between frames, pixel data in each block of a frame is compared with pixel data from various candidate locations in a previous or following frame. The relative position of the candidate that gives the best match may be expressed as a vector which is then used to represent the motion of that block between the frames. By repeating these steps over the blocks of a frame, a set of motion vectors can be generated for the frame which is known as its motion vector field.

Motion estimation techniques commonly use what may be referred to as single-ended motion vectors. FIG. 1 shows an example block based single-ended motion estimation. An image 100 is divided into a regular array of blocks 105, and motion estimation proceeds for each block in turn.

FIG. 1 shows a moving object 110 at a certain position in one frame of a video sequence, and, superimposed onto the same figure, the same object 115, at its position in the previous frame in the sequence. The image data in block 120 contains a number of pixels representing part of object 110. Motion estimation for block 120 involves searching the previous frame in the sequence to find the area of image data with contents most similar to the contents of block 120. Assuming that the motion estimation performs well, the area 125 is found. It can be seen that area 125 is the same size as block 120, but is not aligned to the grid 105. The position of the area of matching pixels 125, relative to block 120, determines motion vector 130 which reflects the motion of object 110, and is said to be the motion vector of block 120.

Single-ended motion estimation works well in some applications, such as video encoding, since it produces one vector for each block, such as 120, in each frame 100 that is encoded.

In a motion compensated frame rate converter it is generally necessary to produce an interpolated frame at an intermediate position between two existing source frames in a video sequence. FIG. 2 shows the motion estimation result from FIG. 1 being used to interpolate image data in a new frame mid-way between two source frames from the original video sequence. Motion estimation for block 200 determines motion vector 205, and pixels for a new area of frame 215, positioned at the midpoint of the vector, are derived from the pixels in block 200 and from the pixels in area 210. Notice that the interpolated area 215 is not necessarily aligned to the block grid.

FIG. 3 illustrates a problem that arises when using single-ended vectors in a frame rate converter. Objects 300 and 305 are moving at different speeds, giving rise to unequal motion vectors 320 and 325 for the blocks 310 and 315 respectively. In this example the vectors are converging. Interpolation of a new frame involves the creation of pixel data at positions 320 and 325, the mid-points of the two vectors. Blocks 310 and 315 are adjacent, but the interpolated areas, 320 and 325 are not. This leads to a hole, 340, in the interpolated frame. An alternative situation exists where vectors diverge, leading to overlap of interpolated areas. In either case, additional frame processing is required to resolve holes and overlap areas, in order to produce an output frame with one value at each pixel position.

FIG. 4 shows an example of double-ended (or bidirectional) motion estimation. When used in the example application of a frame rate converter, this type of motion estimation has the advantage of producing exactly one value for each pixel position in the interpolated frame. The frame to be interpolated, 400, is divided into a regular array of blocks, 405, and motion estimation takes place for each block in turn. Motion estimation for block 405 involves searching the previous and next frames in the sequence for areas of image data that are most similar to each other. The search is constrained, in this example, by requiring that the offsets of the areas tested are equal in magnitude and opposite in direction with respect to the position of block in the interpolated frame (representative of an interpolation at the temporal mid-point between the previous and next source frames). In this example, the best match is found between area 410 in the previous frame and area 415 in the next frame, both of which are shown superimposed onto the grid of blocks in the interpolated frame. Note that neither area is necessarily aligned with the grid. The forward offset 420 is equal to the backward offset 425. In combination the two offsets may be said to be the motion vector of block 405, and represent the motion of an object in the interval between source frames.

Interpolation of pixel data in block 405 requires that pixel data be derived from one or both of the areas of pixel data 410 and 415. The alignment of the grid to the interpolated frame means that exactly one value is produced for each pixel position.

The example of FIG. 4 shows interpolation occurring at the temporal mid-point between two source frames. In frame rate conversion it is common that other interpolation phases are required, for example interpolation at one quarter of the interval between source frames. In such a situation several possibilities exist, two of which are illustrated in FIG. 5.

In one example, a block 500 is motion estimated and interpolated using a method similar to that illustrated in FIG. 4. However, it is known that interpolation at one quarter of the frame interval is required, and so the forward offset 505 is scaled such that it is three times the size of the backward offset 510. The scaled offsets are then used in motion estimation and interpolation. This gives correct interpolation of object 515. Should further interpolations be required, for example at half and three-quarter intervals, further motion estimations are performed with forward and backward offset sizes adjusted accordingly. This method performs well, but may require several motion estimations per source frame interval. Where frame rate is being increased by a large factor, the cost of these motion estimations can be significant.

In another example, interpolation is required at several fractions within the source frame interval, but motion estimation is performed only once per interval, typically at the mid-point. Motion estimation for block 550 therefore searches for matching image areas with equal and opposite offsets, and may find areas 555 and 560 with offsets 565 and 570 respectively. For interpolation, the motion vector is scaled according to the position of the interpolation within the interval. For example, interpolation at one quarter of the interval sees the vector scaled into forward component 575 and backward component 580. Generally, when motion is uniform across large parts of the image, the resulting interpolation is reasonably accurate. The example of FIG. 5 shows an example where an error occurs. Offsets 575 and 580 cause the interpolation to be derived from image areas 585 and 590. Note that the method used for the motion estimation of block 500 would not have selected areas 585 and 590 because the image data in those areas does not match. However, the interpolation of block 550 has no alternative but to derive an interpolated output from this data. The result may be a composite of the two areas, as shown at 595.

Block based motion estimators typically select their output motion vector by testing a set of motion vector candidates for a block against the pixels of the source frames by using a method such as a sum of absolute differences (SAD) or mean of squared differences (MSD) to identify motion vectors which give the lowest error block matches. One or more single-ended or double-ended motion vector candidates are generated to describe the motion of a block of pixels between frames by searching for a match for the block of pixels in that pair of frames.

In various video coding standards, for example, H.264, "B frames" are bi-directionally predicted using a different mechanism to that described above for frame rate conversion. Each encoded block may choose to use one or two reference frames. Where one reference frame is used the encoding is similar to that used in a uni-directionally predicted, "P", frame. Where two reference frames are used, the prediction may be an average of reference pixels taken from one frame preceding the encoded frame, and from one frame following it. The vectors identifying the reference pixel areas in the two reference frames are not necessarily equal in length or co-linear, and motion estimation attempts to match pixel data in each of the reference frames with the pixel data in the block being encoded.

In systems for performing motion estimation, whether configured for video encoding or frame rate conversion, the occluding and revealing of areas of a frame due to the movement of objects within the frame presents a significant problem. This is particularly true for systems using double-ended motion vectors. A simple example occurs where an object moves across a background: at the leading edge of the moving object parts of the background are occluded, and at the trailing edge of the moving object parts of the background are revealed.

FIG. 6 shows a simple example of a revealed area in single-ended motion estimation. The background of the scene is static and contains object 600. Object 605 is in the foreground and is moving from left to right. In the previous frame of the sequence, the same object was in the position shown by the shaded rectangle 610. Motion estimation for block 615 is straightforward. The contents of the block are found in area 620 of the previous frame, and so motion vector 625 is assigned to block 615. Motion estimation for block 630 is complicated by the fact that the background in this area has just been revealed by the motion of object 605. In the current frame, the pixel data for block 630 contains part of the upper edge of triangle 600. The background, including object 600, is not moving, and so it is clear that block 630 should be assigned a zero vector. However, in the previous frame, the area of pixels co-located with block 630 contains the image of moving object 610. The zero vector therefore provides a poor pixel match and a different vector is likely to be selected for the block. In FIG. 6, block 630 has found a match in the contents of area 635, an area of background that is not occluded in the previous frame. Consequently, incorrect vector 640 is selected for that block.

FIG. 7 shows examples of occlusion problems that are specific to systems using double ended vectors. The scene consists of a foreground object 700 which is not moving. The background is moving uniformly from top left to bottom right, with motion that would be correctly described by vector 710. Ideally, motion estimation for block 705 would select vector 710, since block 705 is part of the background. However, in order to select this vector, the motion estimator would be required to find a good match between the areas of pixel data at 715 and 720. This match cannot be found, because the background is occluded by object 700 in area 720. As a result the motion estimator is unlikely to select vector 710, but some other vector that provides a good pixel match, but which does not reflect the true motion of the image. A very similar situation can be seen to exist for block 725. For this reason it is likely that the motion vector field produced by a double ended motion estimator will contain regions of bad vectors in the areas adjacent to an occluding object.

Another situation is illustrated in FIG. 7, where a motion vector for block 730 cannot be determined with confidence. The moving object, 735 in the next frame, and 740 in the previous frame, suggests the motion vector 745. Selection of vector 745 would result in object 735 being interpolated in block 730. Alternatively, since object 700 is not moving, a zero vector might be selected for block 730. In this case, object 735 would not be interpolated in the block. It is not clear which solution is correct and either output is possible, depending on the particular configuration of the system. Object 735 may be part of the background, passing behind object 700, or it may be a foreground object, passing in front of object 700. In general it is difficult to reliably make the correct vector selection without an understanding of the structure of the scene which conventional motion estimators are unlikely to possess.

One technique for addressing the problems caused by occlusions is to perform motion estimation based on additional frames. For example, in order to interpolate a new frame between a pair of frames (typically referred to as the previous and next frames), it can be advantageous to further include motion vector fields generated based on additional past and/or future frames. The benefit of using additional source frames is illustrated in FIG. 8 which shows three different possibilities A), B) and C) for the motion of an object 801 through a sequence of four consecutive frames labelled past, previous, next and future.

In possibility A) the object remains visible throughout the four frames. It is therefore straightforward to track the object through the frames and, by searching for matching pixels representing object 801 in the previous and next frames, a suitable vector 802 can be generated describing the motion of the object between the previous and next frames. In possibility B) the object 801 vanishes between the previous and next frames. This may be due to the object being obscured in the scene represented by the sequence of frames. As a result, the object cannot be tracked between the previous and next frames on the basis of information from those frames alone, as indicated by unknown vector 804. However, by searching for matching pixels representing object 801 in the previous and past frames a good match can be found and a vector 803 generated to describe the movement of the object between those frames. The determination of a good match for the object in the past and previous frames and a poor match in the next and future frames can provide a motion estimator with additional information to help it to correctly determine an appropriate position for the object in an interpolated frame.

In possibility C) the object appears between the previous and next frames. This may be due to the object 801 being revealed in the scene represented by the sequence of frames. As a result, the object cannot be tracked between the previous and next frames on the basis of information from those frames alone, as indicated by unknown vector 805. However, by searching for matching pixels representing object 801 in the next and future frames a good match can be found and a vector 806 generated to describe the movement of the object between those frames. The determination of a good match for the object in the next and future frames and a poor match in the past and previous frames can provide a motion estimator with additional information to help it to correctly determine an appropriate position for the object in an interpolated frame.

FIG. 9 is another illustration of the four frames shown in FIG. 8. The spans between each frame are indicated by past span 901, current span 902 and future span 903. As motion estimation is performed on the sequence of frames, a motion vector field is calculated describing the movement of blocks of pixels between the frames of each of the spans. In order to interpolate a frame in the current span 902 according to the described technique, it is necessary to know the vector fields from the past span 901 and the future span 903. This requires the previous, next and future frames to be available in memory along with at least the vector field in respect of span 901 (the past frame must have been previously read in order to generate the vector field but the past frame itself does not need to be available).

The use of additional frames considerably increases the search space in which the matching of blocks of pixels is performed. This can result in unrealistic processing requirements, particularly at low power mobile devices (e.g. a mobile device configured to perform video encoding) and/or at devices configured to perform motion estimation in real-time (e.g. frame rate conversion during playback of a video stream). The need to store additional frames and vector field information also substantially increases the memory requirements of devices for performing motion estimation. And in addition, the use of additional future frames necessarily introduces delay into the system since motion estimation cannot be completed until the future frame has been processed.

BRIEF SUMMARY OF THE INVENTION

According to a first aspect of the present invention there is provided a data processing system for performing motion estimation in a sequence of frames comprising first and second frames each divided into respective sets of blocks of pixels, the system comprising:

a vector generator configured to form motion vector candidates representing mappings of pixels between the first and second frames; and a vector processor configured to, for a search block of the first frame, identify a first motion vector candidate ending in a block of the second frame collocated with the search block and form an output vector for the search block which is substantially parallel to the first motion vector candidate and represents a mapping of pixels from the search block to the second frame.

The first frame may precede the second frame in the sequence with the output vector being directed forwards in time. Alternatively, the first frame may follow the second frame in the sequence with the output vector being directed backwards in time.

The vector processor may be configured to form the output vector if no motion vector candidates are available for the search block.

The data processing system may further comprise a candidate assessor configured to calculate a score for each motion vector candidate, each score being a measure of the similarity of the pixels in the first and second frames at each end of the respective motion vector candidate, and the candidate assessor being configured to cause the vector processor to form the output vector if:

the scores of one or more motion vector candidates available for the search block are indicative of a low similarity between the pixels at the endpoints of each respective motion vector candidate; or no motion vector candidates are available for the search block; the data processing system being configured to use the output vector as a vector describing the mapping of pixels from the search block to the second frame.

The candidate assessor may be configured to, if at least one motion vector candidate is available for the search block having a score indicative of a high similarity between the pixels at its endpoints, provide for use as a vector describing the mapping of pixels from the search block to the second frame the motion vector candidate having a score indicative of greatest similarity between its endpoint pixels.

The vector processor may be configured to replace any motion vector candidates stored for the search block with the output vector.

The data processing system may further comprise a candidate assessor configured to calculate a score for each motion vector candidate, each score being a measure of the similarity of the pixels in the first and second frames at each end of the respective motion vector candidate, wherein the vector processor is configured to add the output vector to any motion vector candidates available for the search block and the data processing system being configured to use as a vector describing the mapping of pixels from the search block to the second frame the vector having a score indicative of greatest similarity between its endpoint pixels, the output vector being assigned a predefined score or a score formed in dependence on the score of the first motion vector candidate.

The vector processor may be configured to process each block of the first frame as a search block so as to, in each case that a motion vector candidate ends in a respective collocated block of the second frame, form an output vector for that block of the first frame.

The candidate assessor may be configured not to calculate a score for the output vector.

The motion vector candidates may include single-ended vectors originating at blocks of the first and/or second frames.

The motion vector candidates may include double-ended vectors originating at blocks of an interpolated frame between the first and second frames.

The vector processor may be configured to identify the collocated block of the second frame as a block of the second frame which is located at a frame position corresponding to the search block of the first frame.

The motion vector candidates may include single-ended motion vector candidates and the vector generator may be configured to form a single-ended motion vector candidate for a block of the second frame by identifying an area of pixels in the first frame which most closely matches the pixels of the block of the second frame, and/or to form a single-ended motion vector candidate for a block of the first frame by identifying an area of pixels in the second frame which most closely matches the pixels of the block of the first frame.

The motion vector candidates may include double-ended motion vector candidates and the vector generator may be configured to form a double-ended motion vector candidate for a block of an interpolated frame between the first and second frames by identifying matching areas of pixels in the first and second frames, the areas of pixels in the first and second frames having a predefined relationship to the block of the interpolated frame.

The vector processor may be configured to form the output vector using pixel data from the first and second frames only.

The vector processor may be configured to form the output vector using motion vector candidates generated in respect of the span between the first and second frames only.

The vector processor may be configured to determine the direction of the output vector further in dependence on the directions of one or more motion vector candidates ending in blocks neighbouring the collocated block of the second frame.

The output vector may be a single-ended vector originating at the search block of the first frame.

The output vector may be a double-ended vector originating at a block of an interpolated frame between the first and second frames and having an endpoint at the search block of the first frame.

The data processing system may further comprise interpolation logic configured to operate the output vector on pixels of the search block so as to generate a block of an interpolated frame between the first and second frames.

The data processing system may further comprise encoding logic configured to use the output vector in the generation of an encoded video stream.

According to a second aspect of the present invention there is provided a method for performing motion estimation in a sequence of frames, the sequence comprising first and second frames each divided into respective sets of blocks of pixels, the method comprising:
  forming motion vector candidates representing mappings of pixels between the first and second frames; and for a search block of the first frame:
    identifying a first motion vector candidate ending in a block of the second frame collocated with the search block of the first frame; and
    forming an output vector for the search block which is substantially parallel to the first motion vector candidate and represents a mapping of pixels from the search block to the second frame.

The forming an output vector may be performed if no motion vector candidates are available for the search block.

The method may further comprise:
  calculating a score for each motion vector candidate, each score being a measure of the similarity of the pixels in the first and second frames at each end of the respective motion vector candidate; and
  using the output vector as a vector describing the mapping of pixels from the search block to the second frame;
wherein the forming of the output vector performed in response to:
  the scores of the one or more motion vector candidates available for the search block being indicative of a low similarity between the pixels at the endpoints of each respective motion vector candidate; or
no motion vector candidates being available for the search block.

The method may comprise, responsive to at least one motion vector candidate being available for the search block having a score indicative of a high similarity between the pixels at its endpoints, not performing the forming of the output vector and providing for use as a vector describing the mapping of pixels from the search block to the second frame the motion vector candidate having a score indicative of greatest similarity between its endpoint pixels.

The method may further comprise:
  calculating a score for each motion vector candidate, each score being a measure of the similarity of the pixels in the first and second frames at each end of the respective motion vector candidate;
  assigning the output vector a predefined score or a score formed in dependence on the score of the first motion vector candidate;
  adding the output vector to any motion vector candidates available for the search block; and
  using as a vector describing the mapping of pixels from the search block to the second frame the vector having a score indicative of greatest similarity between its endpoint pixels.

The method may further comprise repeating the identifying and forming steps over each block of the first frame so as to, when a motion vector candidate ends in a respective collocated block of the second frame, form an output vector for each block of the first frame.

The forming of the output vector may be performed using pixel data from the first and second frames only.

The forming of the output vector may be performed using motion vector candidates generated only in respect of the span between the first and second frames.

The forming of the output vector may comprise determining the direction of the output vector further in dependence on the directions of one or more motion vector candidates ending in blocks neighbouring the collocated block of the second frame.

Computer program code may be provided defining the data processing system whereby the data processing system is manufacturable. A non-transitory computer readable storage medium may be provided having stored thereon computer readable instructions that, when processed at a computer system for generating a manifestation of an integrated circuit, cause the computer system to generate a manifestation of the data processing system.

Computer readable code may be provided for implementing the method of performing motion estimation. A non-transitory computer readable storage medium may be provided having stored thereon computer readable instructions that, when processed at a processor, cause the processor to implement the method of performing motion estimation.

BRIEF DESCRIPTION OF THE DRAWINGS

The present invention will now be described by way of example with reference to the accompanying drawings. In the drawings.

DETAILED DESCRIPTION OF THE INVENTION

The following description is presented by way of example to enable any person skilled in the art to make and use the invention. The present invention is not limited to the embodiments described herein and various modifications to the disclosed embodiments will be readily apparent to those skilled in the art.

There is a need for a method and system for motion estimation which enables motion vectors to be generated in respect of all blocks of pixels in a sequence of frames and which addresses the high memory and processing requirements of conventional techniques for high quality motion estimation.

In the examples described herein, the methods and systems for performing motion estimation perform block based motion estimation. Other types of motion estimation are known and it is envisaged that the principles described herein may be applied to such other types of motion estimation. The methods and systems for performing motion estimation described herein may be applied to interlaced or non-interlaced video data.

Figure 10:
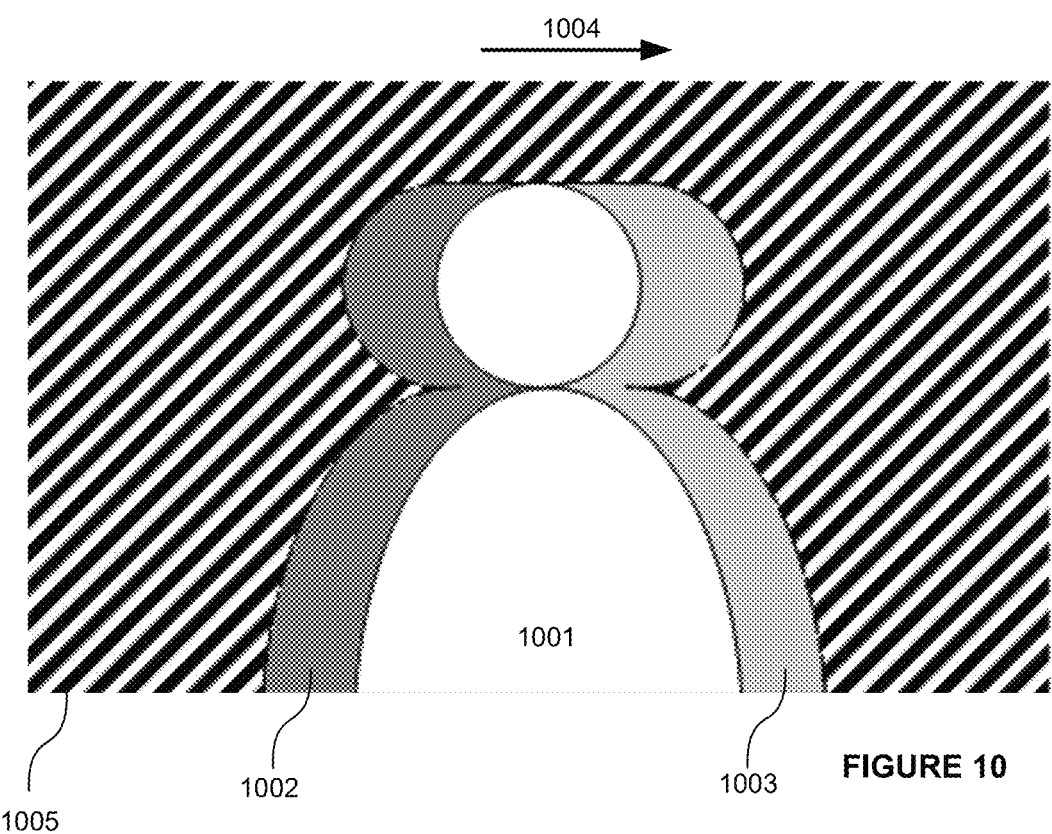
FIG. 10 illustrates the occlusion problem encountered by motion estimation systems.

FIG. 10 illustrates the occlusion problem encountered by motion estimation systems. The figure shows a static object 1001 (e.g. a person in white) in front of a diagonal-striped background 1005 which is moving relative to the object with the velocity indicated by motion vector 1004. Most of the image can be tracked very well between a pair of frames (e.g. all of object 1001 and much of background 1005). However, the pixels in region 1002 will be occluded by the movement of the background such that those pixels are visible in the previous frame but not the next frame. Similarly, the pixels in region 1003 will be revealed by the movement of the background such that those pixels appear in the next frame but are not present in the previous frame. (Note that similar occlusion regions will be present at the left and right edges of the frame shown in FIG. 10 but these have been omitted for simplicity.)

The pixels of regions 1002 and 1003 cannot be tracked in the current span between the previous and next frames and therefore cannot be interpolated correctly without further information. Because no good match exists for the pixels of these regions in the next/previous frame, motion estimation systems will tend to generate spurious motion vectors for the respective blocks. This leads to halos of mismapped pixels being formed about moving objects.

Figure 11:
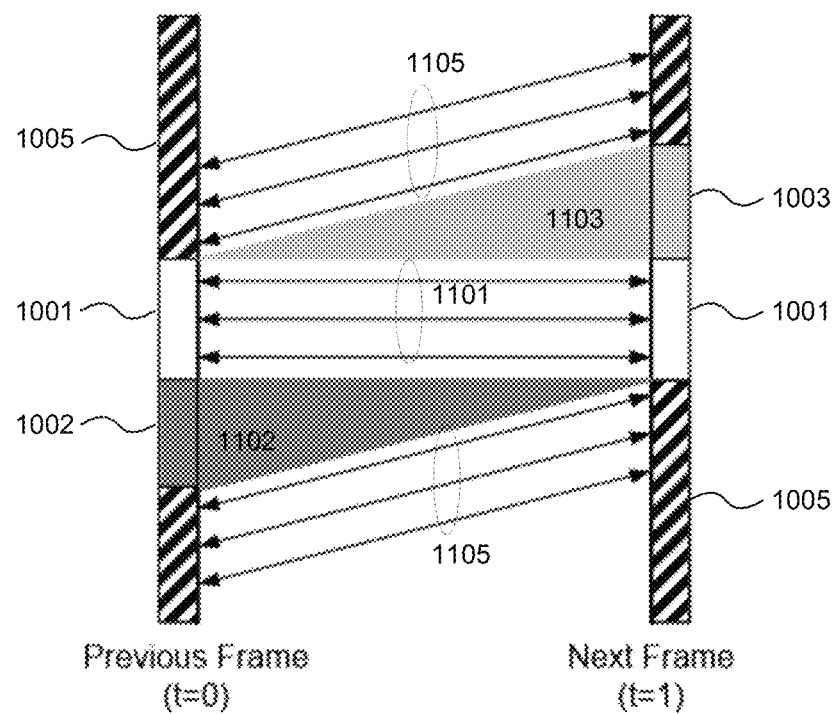
FIG. 11 illustrates the occlusion problem in an alternative manner.

The occlusion problem of FIG. 10 is illustrated in an alternative manner in FIG. 11 in which time runs from left to right and the up-down direction in the figure corresponds to a spatial dimension of the frames. Background regions 1005 can be tracked well both forwards from the previous frame to the next frame and backwards from the next frame to the previous frame, as indicated by motion vectors 1105. The static white object can also be tracked well as indicated by motion vectors 1101. Motion vectors 1105 and 1101 represent good vectors because, when tested, a high similarity is found between the pixels at their endpoints. However, the pixels of region 1002 in the previous frame are not present in the next frame because they have moved behind the white object during the span. Similarly, the pixels of region 1003 in the next frame are not present in the previous frame because they have been revealed from behind the white object during the span. Triangular regions 1102 and 1103 therefore illustrate areas of pixels in hypothetical frames that cannot be correctly interpolated at various time intervals during the span.

Figure 12:
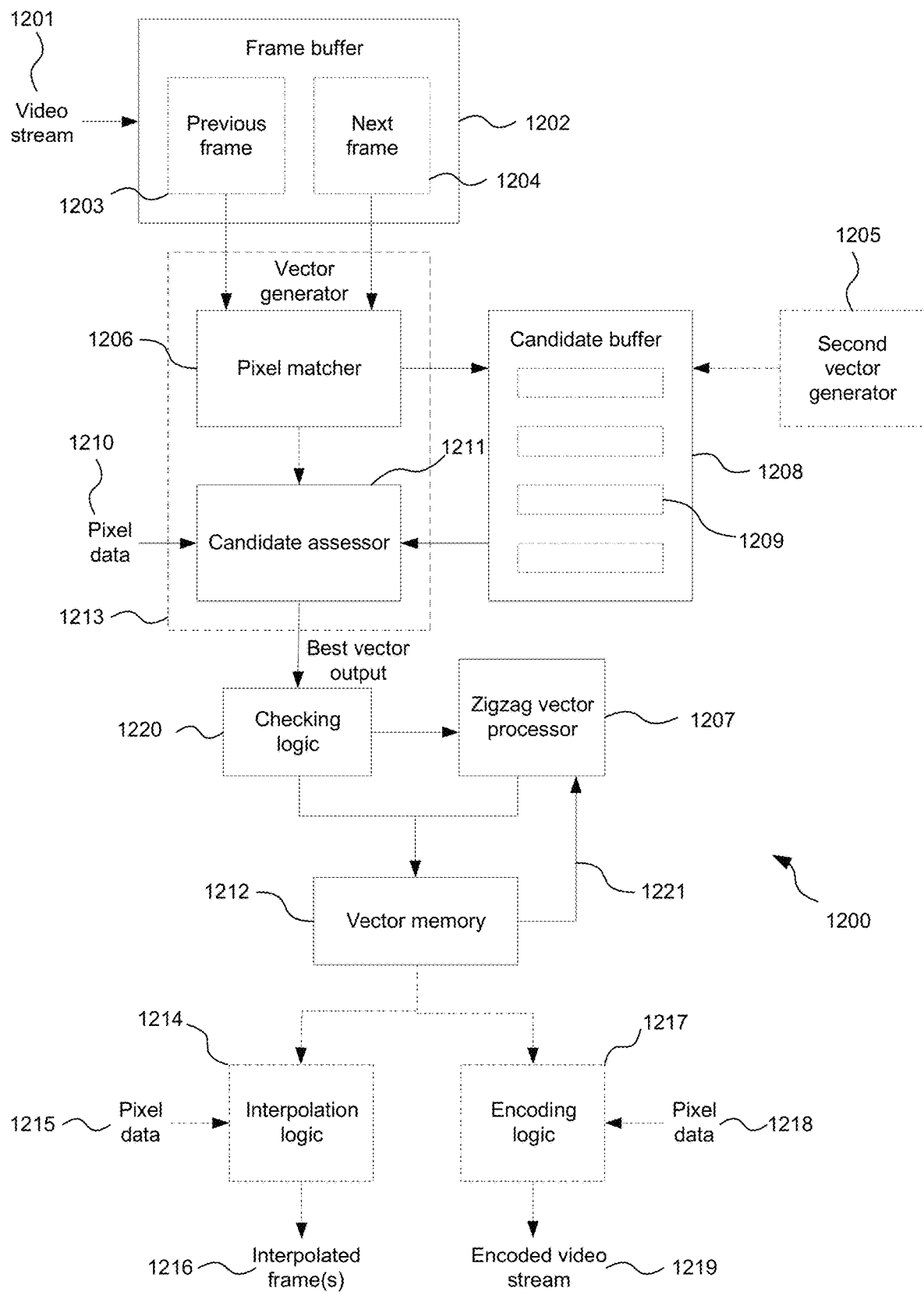
FIG. 12 shows a data processing system for performing motion estimation in a sequence of frames.

A data processing system 1200 for performing motion estimation in a sequence of frames is shown in FIG. 12. The configuration of the system so as to address the occlusion problem in a memory efficient manner which can be performed by relatively low power processors will now be described. The system of FIG. 12 is merely an example and other configurations are possible in accordance with the principles described herein.

Data processing system 1200 is configured to receive a stream of frames 1201 which in this example comprises a sequence of video frames. At least two consecutive frames of the stream are stored at frame buffer 1202. These frames will be referred to as the previous frame 1203 and next frame 1204 indicating that the frames represent the start and end (respectively) of a current span in respect of which one or more motion vectors are to be determined. The system could be configured to identify single-ended vectors for blocks of the previous frame or next frame (e.g. in the case the system is configured to perform video encoding) and/or double-ended vectors for a current frame interpolated between the previous and next frames (e.g. in the case the system is configured to perform frame rate conversion). Each block represents a region of the previous/next/current frame comprising a group of pixels whose movement between the previous and next frames across the current span is to be identified.

Figure 1:
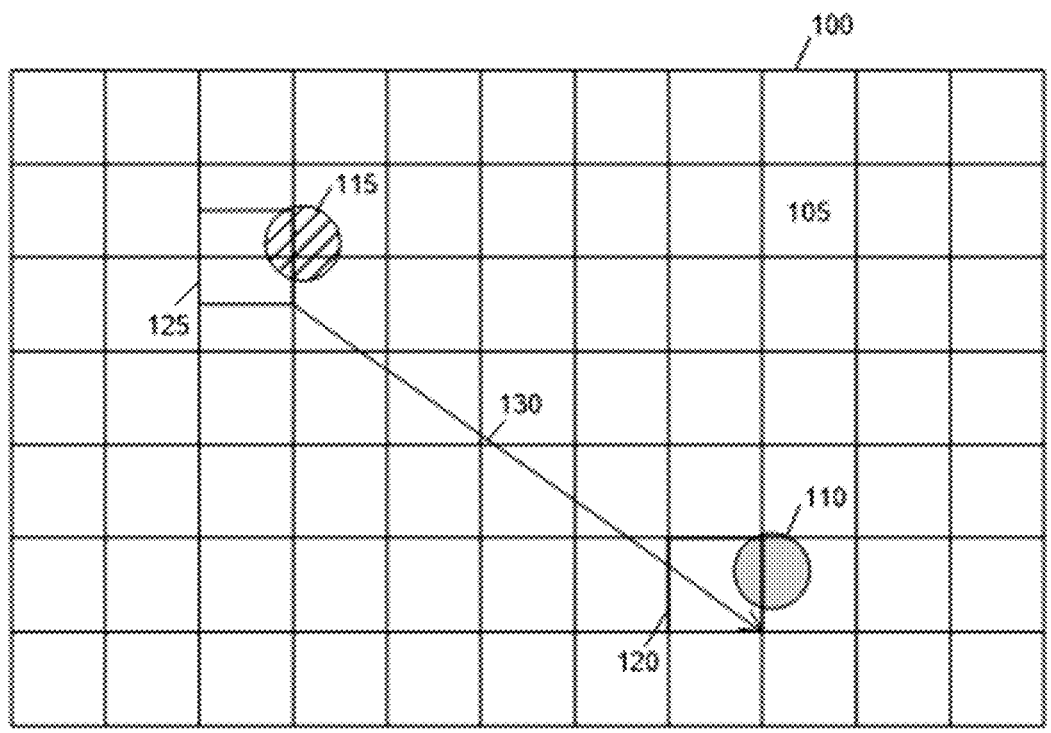
FIG. 1 shows an example block based single-ended motion estimation.
Figure 2:
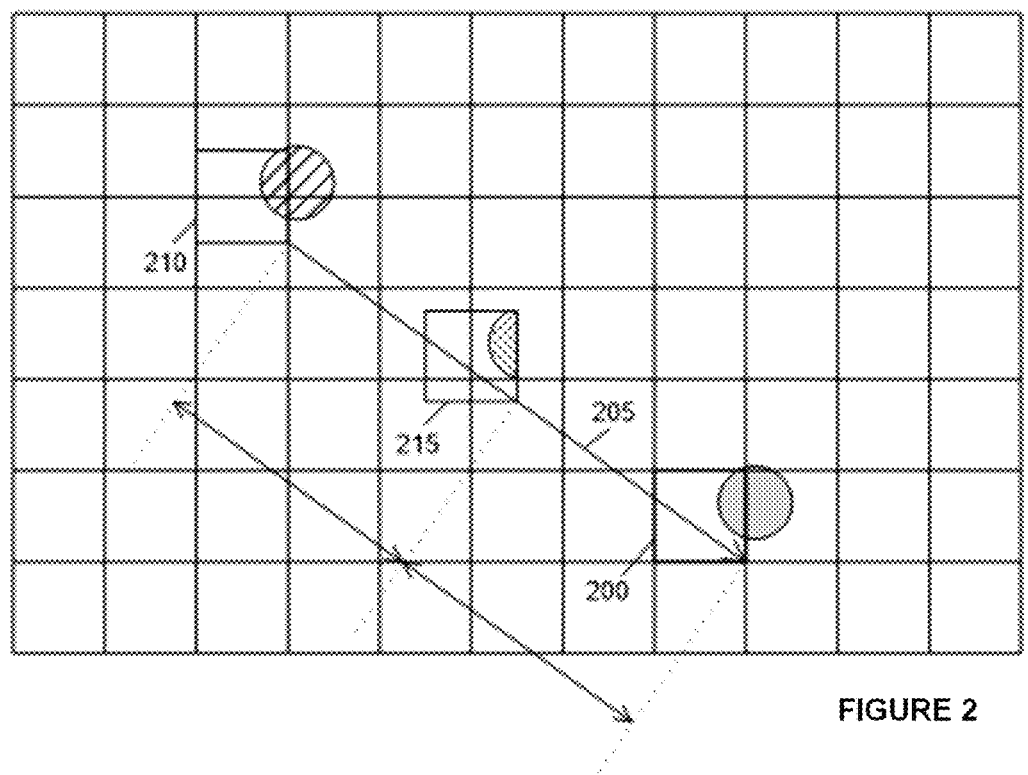
FIG. 2 shows the motion estimation result from FIG. 1 being used to interpolate image data in a new frame mid-way between two source frames from the original sequence of frames.
Figure 3:
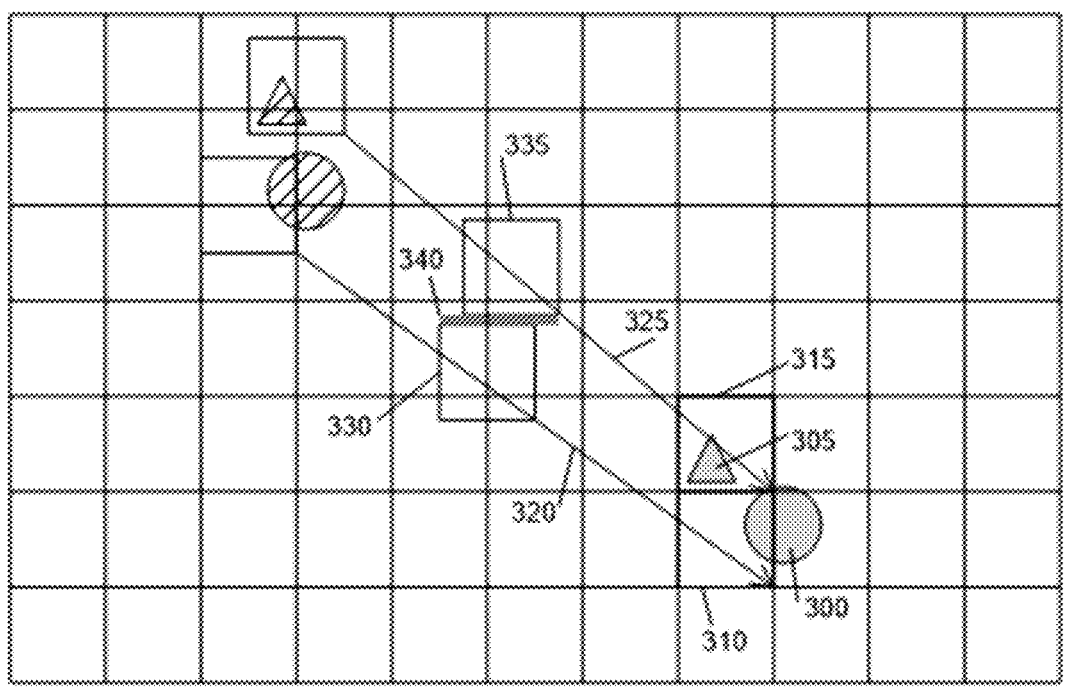
FIG. 3 illustrates a problem that arises when using single-ended vectors in a frame rate converter.
Figure 4:
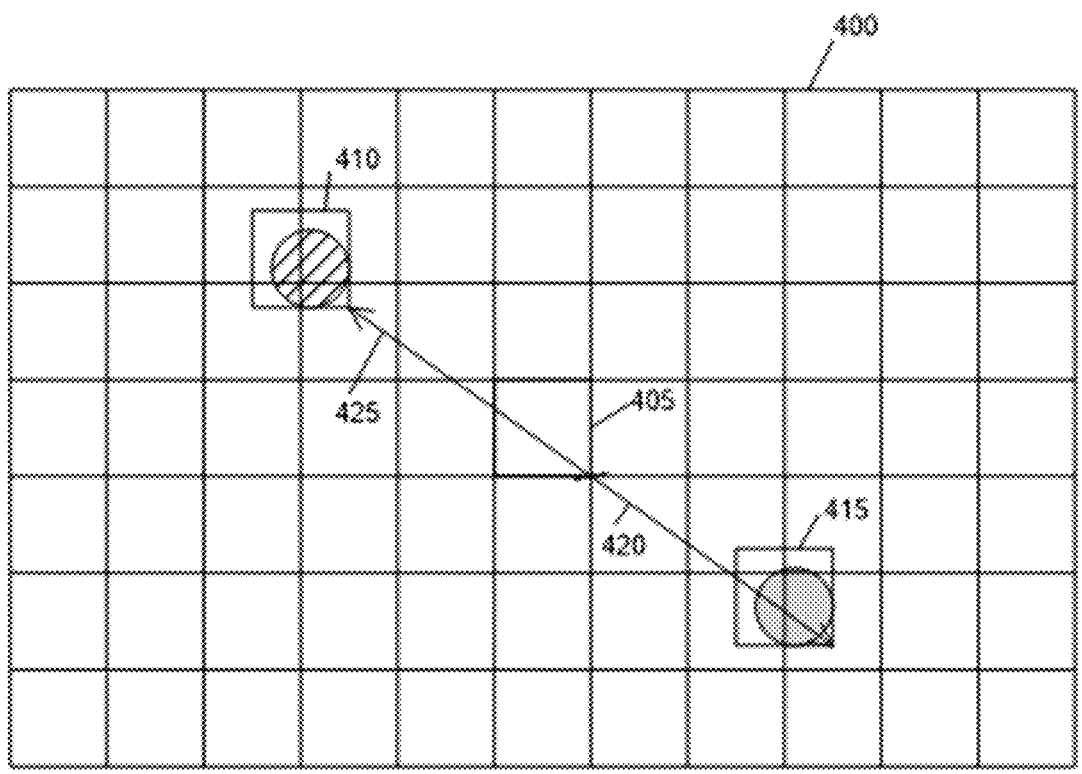
FIG. 4 shows interpolation occurring at a temporal mid-point between two source frames.
Figure 5:
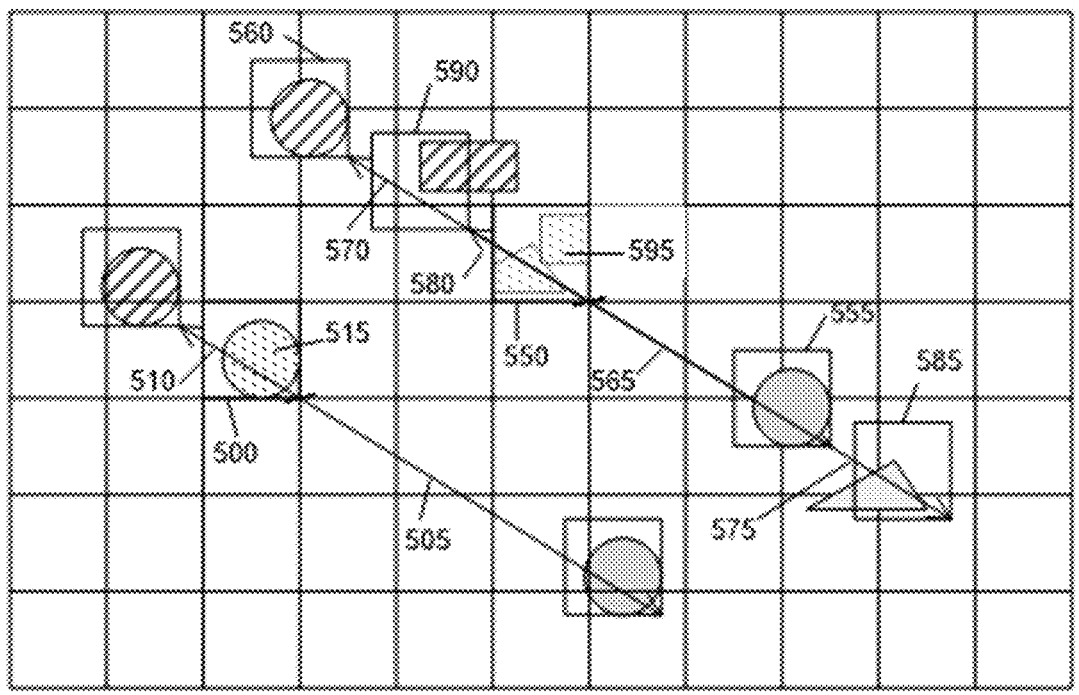
FIG. 5 shows interpolation occurring at other points between two source frames.
Figure 6:
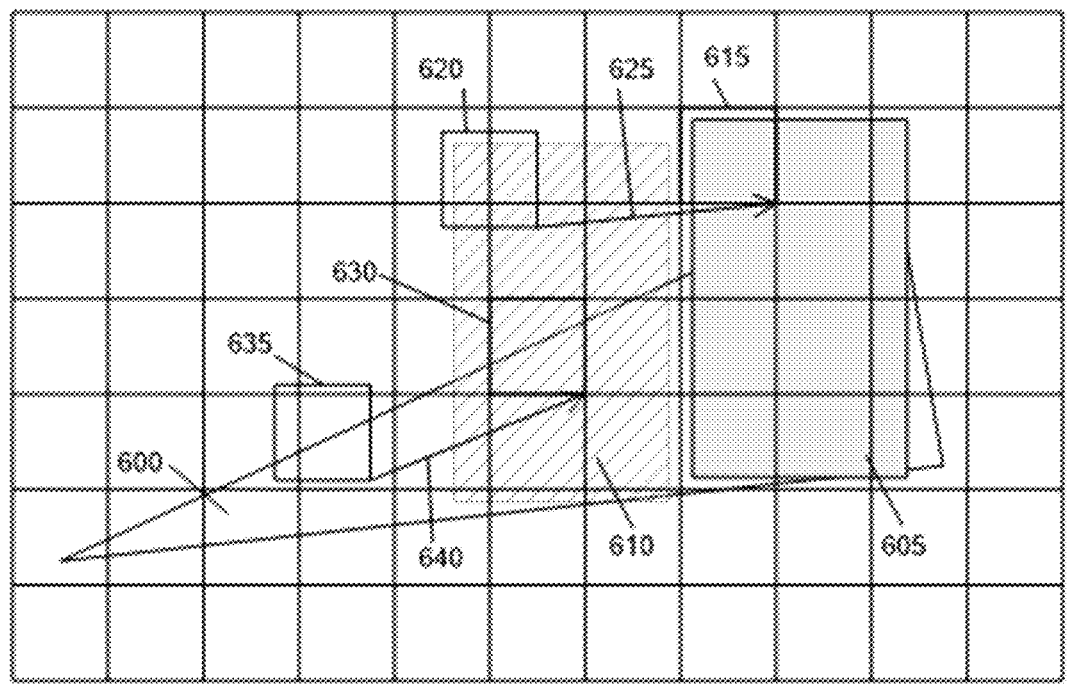
FIG. 6 shows a simple example of a revealed area in single-ended motion estimation.
Figure 7:
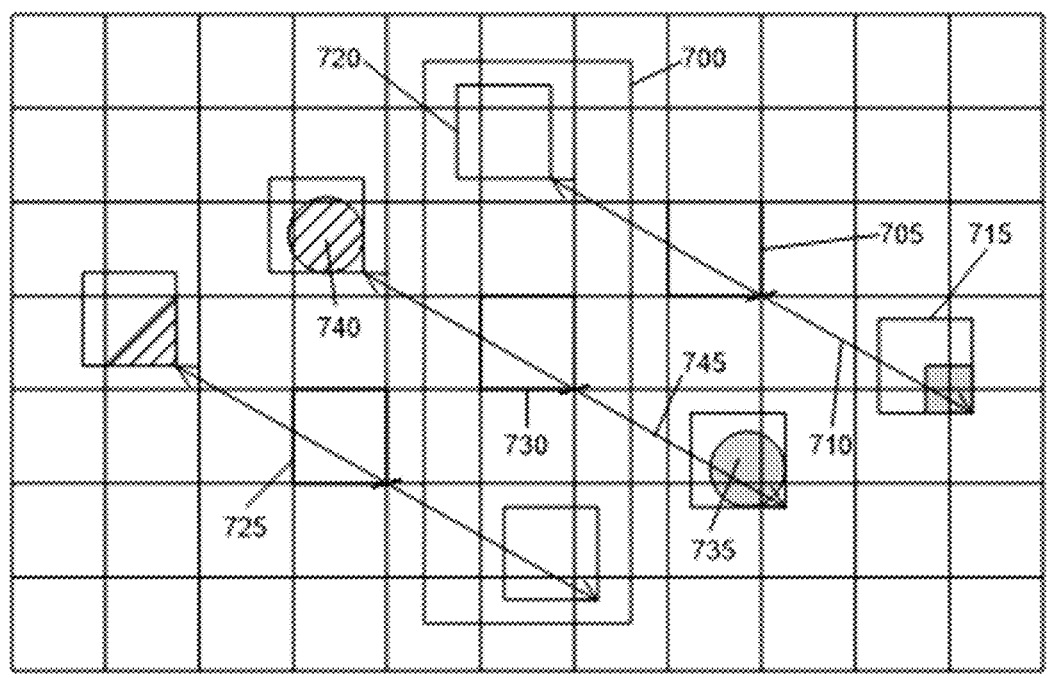
FIG. 7 shows examples of occlusion problems that are specific to systems using double ended vectors.

A vector generator 1213 of the system is configured to generate a motion vector for each block which describes a best estimate of the movement of the pixels represented by the block between the previous and next frames. This may be achieved as follows. Vector generator 1213 includes a pixel matcher 1206 to which the previous frame 1203 and next frame 1204 are made available. The pixel matcher searches the previous and next frames in order to identify similar groups of pixels in the previous and next frames which correspond to the block under consideration. This generates for each block one or more vectors describing the relative position of the regions in the previous and next frames which best match one another. The pixel matcher may search for similar groups of pixels according to any suitable algorithm and so as to generate single-ended and/or double-ended vectors. The pixel matcher may determine the similarity of groups of pixels in the two frames based on a measure of the differences between the pixels of the two groups—e.g. a sum of the absolute differences (SAD) or a mean of the squared differences (MSD) in a given pixel value, such as colour or luma. For example, the pixel matcher may generate single-ended vectors in the manner described above with respect to FIG. 3 and/or double-ended vectors in the manner described above with respect to FIG. 4. The one or more single-ended or double-ended vectors generated by the pixel matcher are provided as motion vector candidates 1209 to a candidate buffer 1208. For example, in a system configured to perform double-ended motion estimation, up to three double-ended vectors representing the best matches identified for a block may be provided to the candidate buffer.

The pixels searched by the pixel matcher in the previous and next frames may be selected according to a predefined pattern or in dependence on additional information. For example, search regions may be selected in dependence on the motion vector(s) (or derivative(s) thereof) established for the block or neighbouring blocks in respect of one or more previous spans, and/or search regions may be selected based on the similarity of colour or luma values of pixel regions.

In practice, it is not usually possible to search every possible mapping of a block of pixels between frames and the object represented by those pixels may change in size or orientation between frames due to its movement in the scene. As a result, it is not always possible to identify the most appropriate motion vector by a pixel-matching search of consecutive frames alone. It can therefore be advantageous to generate additional candidate vectors for assessment.

A second vector generator 1205 may optionally be provided to generate any number of different vector candidates derived by mechanisms other than matching pixels between the previous and next frames. The second vector generator may operate at any suitable time with respect to the operation of the vector generator.

Other vector candidates may be generated for a block by the second vector generator in various ways. Motion vectors are known to be highly correlated both spatially and temporally with vectors in adjacent blocks, so the second vector generator 1205 could introduce neighbouring vectors into the set of vector candidates for a block. This can be especially useful when those neighbouring vectors represent a good match between pixels (e.g. have a low SAD) and the best vector established by the pixel matcher represents a poor match (e.g. has a high SAD). The second vector generator 1205 may provide one or more candidates based on the output motion vector calculated for the block in respect of previous spans, or based on motion vectors formed in previous spans which end in the block.

The second vector generator may alternatively or additionally generate one or more pseudo-random vector candidates so as to allow the system to improve its matches and introduce an adaptive element as the motion in the sequence of frames changes. Where a block has motion that is not simply predicted by its neighbours, the pseudo-random perturbation of vector candidates can often predict the changes in motion. This method works well for slowly changing vector fields.

The vector candidates 1209 held for a block at candidate buffer 1208 are assessed in order to determine which of the candidates represents the best estimate for the motion vector of the block. This assessment is performed at candidate assessor 1211. The candidate assessor may determine the best vector output of the vector generator in any suitable manner. For example, the assessor may compare the groups of pixels of the previous and next frames at each end of the vector in order to determine the similarity of those groups.

In the present example, an error score is formed representing the degree of similarity of the pairs of pixels groups indicated by each candidate vector so as to allow comparison of the vectors. Such an error score could, for example, be determined based on a measure of the differences between pixels of the two groups—e.g. a sum of the absolute differences (SAD) or a mean of the squared differences (MSD) in a given pixel value, such as colour or luma. The error score may further depend on the similarity of vectors generated for neighbouring blocks such that the error score of a block is a compound measure of the pixel differences between its endpoint blocks and a measure of the similarity of the vectors formed in respect of neighbouring blocks. Various algorithms are known in the art for generating such error scores, including iterative algorithms which form an initial set of vectors which are selected on the basis of pixel similarity alone which are then refined based on the similarity of neighbouring vectors. In alternative examples, other types of score may be formed for a vector as a measure of confidence in the vector—e.g. a confidence that the vector represents true motion between frames.

In the examples described herein, the vector with the lowest error score is selected as the best vector output of the vector generator because a lower error score is indicative of greater similarity between the pixels at its endpoints. In other examples, other measures of similarity could be used, including measures for which a high value is indicative of a high level of similarity between the pixels at its endpoints.

In the present example the candidate assessor operates on the values of pixels in the previous and next frames and is therefore provided with access to pixel data 1210. This may be limited to the pixel data required by the assessor in order to form an error score for each vector candidate, or the pixel values of the previous and next frames may be made available in their entirety to the assessor (e.g. the assessor may be operable to perform a lookup into frame buffer 1202).

It may be advantageous to provide the candidate assessor 1211 with data generated by pixel matcher 1206, as indicated by the dashed arrow in FIG. 12. For example, if the pixel matcher identifies vector candidates by matching groups of pixels in the previous and next frames, the pixel matcher may generate data which the assessor can use in its determination of an error score for the candidates generated by the pixel matcher. In some implementations, the pixel matcher could provide the error score itself for the candidates generated by the pixel matcher: e.g. in the case that the pixel matcher calculates a sum of the absolute differences (SAD) for a candidate vector and the candidate assessor uses a sum of the absolute differences as its error score for each vector.

Other approaches for determining the most appropriate vector for a block are known and any such approach may be used in combination with the generation of zigzag vectors in accordance with the principles described herein.

When configured in a conventional manner the vector generator 1213 suffers from the occlusion problem described above with respect to FIGS. 10 and 11. In order to address this, system 1200 includes a zigzag vector processor 1207 which provides a vector candidate in occlusion regions based on the previous and next frames alone.

In a preferred example, a zigzag vector is generated when the error score of the best vector output from the vector generator is above a predetermined threshold. In other words, a zigzag vector may be generated for a block when the best vector candidate for that block represents a poor pixel match between previous and next frames. This can be implemented through the use of checking logic 1220 arranged to check whether the error score of the best vector output of the vector generator 1213 is above a predetermined threshold. The checking logic may be integral with the candidate assessor or provided at any other element of the system and considered to be a function of the candidate assessor. In FIG. 12, the checking logic is shown as a being distinct to the candidate assessor but this is merely one possibility. The error score of the best vector as determined by the candidate assessor could be passed with the best vector so as to avoid requiring that the checking logic 1220 recalculate the error score.

If the error score of the best vector output indicates that the vector represents a poor match between the previous and next frames (e.g. its score lies above the predetermined threshold), the checking logic causes a zigzag vector processor 1207 to generate a zigzag vector for the block to which the best vector output relates. If the error score of the best vector output indicates that the vector represents a good match between the previous and next frames (e.g. its score lies below the predetermined threshold), the best vector output may be provided to a vector memory 1212 for storage as an element of a vector field describing the current span between previous and next frames. Appropriate predetermined thresholds for use at checking logic 1220 can be determined for the particular implementation of system 1200 through trial and error. Such thresholds may be selected so as to, for example, optimise the quality of (say) an encoded/interpolated video output of the system, and/or minimise the additional processing overhead for each frame due to zigzag generation. Additionally or alternatively, for a given threshold (e.g. a fixed threshold) in a system configured to generate zigzag vectors by default (e.g. for all blocks), the error score of vector candidates may be modified in order to promote or inhibit the use of zigzag vectors. For example, a penalty term could be added to the error score of zigzag vectors to bias against their use. This can be useful where the error score of a zigzag vector is generated from the error scores of its constituent vectors—e.g. in general, the error score of a zigzag vector may be defined to be the error score of the block vector on which it is based plus a penalty value.

The generation of a zigzag vector will now be explained with reference to FIGS. 13 and 14 which illustrate the same occlusion scenario as shown in FIGS. 10 and 11.

In the system, frames of the sequence (and any generated frames such as interpolated frame 1306 in FIGS. 13 and 14) may be divided up into a common set of blocks of pixels such that for each block in a given frame there is a collocated (but in this case temporally separated) block in each other frame. Alternatively, each frame may be divided into a set of blocks selected for that frame (perhaps based on the content of the frame), and the zigzag vector processor identifies which block of the previous/next frame is collocated with the block under consideration on generating a zigzag vector (e.g. the generator could lookup which block of the respective previous/next frame lies at the coordinates defining the centre of the output block for which a zigzag vector is to be generated).

Figure 13:
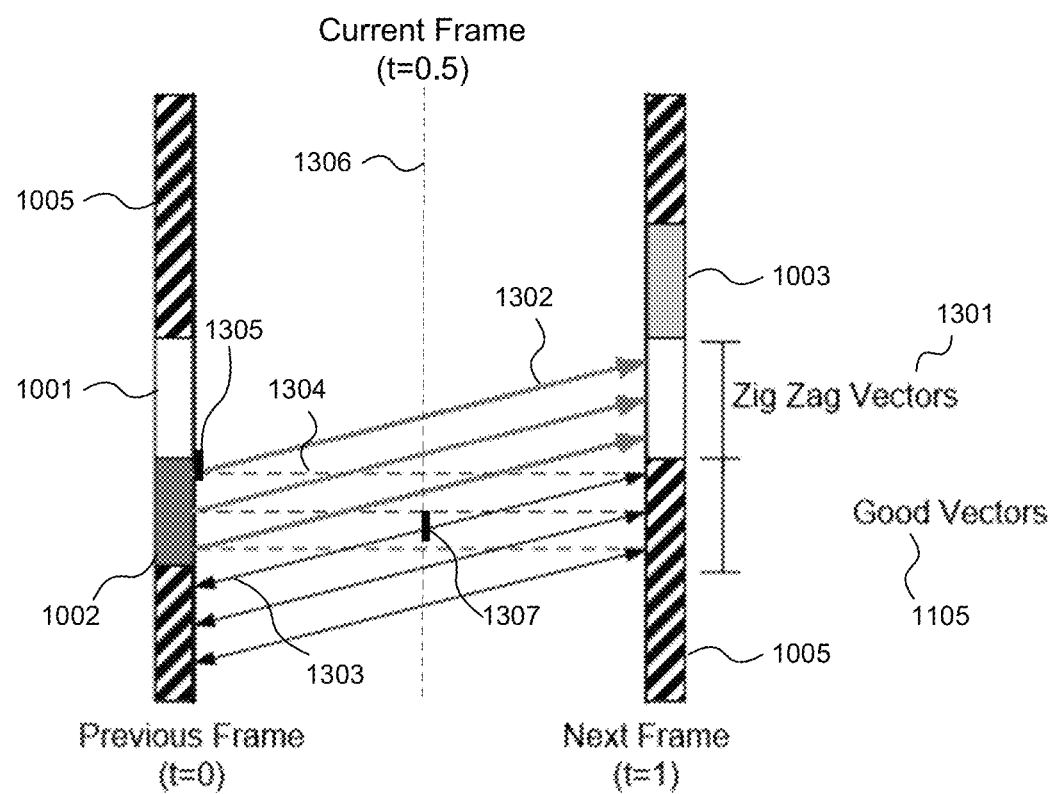
FIG. 13 illustrates the generation of a first set of zigzag vectors for the same occlusion scenario as shown in FIGS. 10 and 11.

For clarity, FIG. 13 focusses on the generation of zigzag vectors for occlusion region 1002 in a system performing bidirectional motion estimation so as to form an interpolated current frame 1306 between the previous and next frames. In relation to FIG. 11, it was described above that it is not possible to generate the correct motion vectors for occlusion region 1002 from the previous and next frames alone. This leads to a region 1102 in FIG. 11 for which it is not possible to correctly generate pixels for interpolated frames lying between the previous frame at time t=0 and the next frame at time t=1. The zigzag vector processor of the vector generator shown in FIG. 12 is configured to generate vectors for the occlusion region 1002 by creating vectors 1301 for the blocks in that region which are parallel to the vectors ending in the corresponding blocks of the other frame of the pair. These vectors 1301 are zigzag vectors.

The creation of a particular zigzag vector 1302 will now be described. In the example shown in the figures, bidirectional motion vector 1303 is generated for a block 1307 of the current frame by searching for matching groups of pixels in the previous and next frames. Matching groups of pixels are found at the endpoints of vector 1303 in the previous and current frames such that the vector represents the movement of that group of pixels from the previous frame to the next frame. No good match can be found in the next frame for the blocks of region 1002 of the previous frame because that region becomes occluded between those frames.

In order to generate vectors for the blocks of region 1002, the zigzag vector processor looks to the single-ended or double-ended vectors having endpoints in the collocated blocks of the next frame. For example, in order to generate a vector for block 1305, the zigzag vector processor identifies the collocated block in the next frame as indicated by dashed line 1304. The zigzag vector processor creates a vector for block 1305 which is parallel to the bidirectional vector 1303 which ends in the collocated block of the next frame. This vector is zigzag vector 1302 as shown in FIG. 13. The zigzag vector may be single-ended or double-ended but is valid only when interpolating from the previous frame to the next frame.

Figure 14:
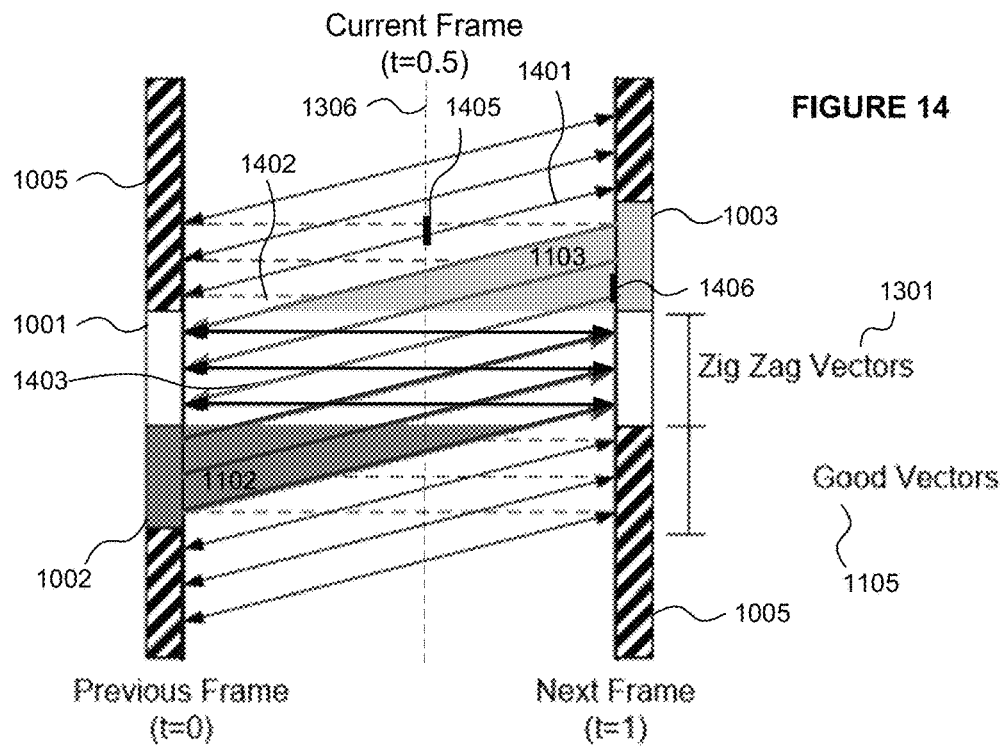
FIG. 14 illustrates the generation of a second set of zigzag vectors for the same occlusion scenario as shown in FIGS. 10 and 11.

FIG. 14 additionally illustrates the generation of zigzag vectors for region 1003 of the next frame. This region is revealed between the previous and next frame and therefore it is not possible to find a match for the pixels of the blocks of region 1003 in the previous frame. FIG. 14 includes the triangular regions of uncertainty 1103 and 1102 from FIG. 11. The creation of zigzag vectors allows pixels to be correctly interpolated for these regions at various time intervals during the span.

In the same manner as described with respect to FIG. 13, the zigzag vector processor creates zigzag vectors for the blocks of region 1003 based on the vectors having endpoints in the respective collocated blocks of the previous frame.

For example, in order to generate a vector for block 1406, the zigzag vector processor identifies the collocated block in the previous frame as indicated by dashed line 1402. The zigzag vector processor creates a vector for block 1406 which is parallel to the bidirectional vector 1401 which ends in the collocated block of the previous frame. This vector is zigzag vector 1403 as shown in FIG. 14. This zigzag vector is valid only when interpolating from the next frame to the previous frame.

As indicated by arrow 1221, the zigzag vector processor is able to access vector memory 1212 which stores the best vector outputs generated by the vector generator. The zigzag vector processor looks up the vector defined for collocated blocks in the vector memory so as to create zigzag vectors. The zigzag vector processor can experience delays if the vector information required to generate a zigzag vector for a particular block is not present in the vector memory at the point it is required. Various mechanisms could be used to address this. For example, the zigzag vector processor could provide an input queue for blocks in which zigzag vector generation is to be performed, with the generator being configured to continuously or periodically cycle through the blocks in the input queue—if a required vector is not present, the generator would move onto the next block in the queue; if the required vector is present, the generator creates the respective zigzag vector and then moves onto the next block in the queue. In other words, an input queue allows the zigzag vector processor to perform processing asynchronously with respect to the output of the vector generator. In other examples the zigzag vector processor could be configured to delay processing until vectors are available for some predefined proportion of the blocks or until after the vector generator has processed all of the blocks of the current span (e.g. the zigzag vector processor may process blocks of one span while the vector generator is processing the blocks of the next span.

In general, a zigzag vector may be generated for a block as a single-ended or double-ended vector substantially parallel to the single-ended or double-ended vector ending in the collocated block of the other frame of the pair. A single-ended zigzag vector would be directed so as to start from the block under consideration and end in the other frame of the pair defining the current span. In the system 1200 of the present example, single-ended, double-ended or a mixture of double-ended and single-ended zigzag vectors may be generated. Any single-ended vector may be trivially converted into a double-ended vector, and vice versa. For example, to create a double-ended vector at the temporal midpoint of the current span, a single-ended vector could be split at its midpoint and a double-ended vector comprising equal and opposite forward and backward parts stored at that midpoint. In using double-ended zigzag vectors, system 1200 is configured to interpolate pixels for the block of the double-ended zigzag vector from the origin of the equivalent single-ended zigzag vector (e.g. the single-ended zigzag vector from which the double-ended zigzag vector is created). The system may be arranged to store information identifying a valid direction of interpolation for each double-ended vector generated by the zigzag vector processor. In some examples, since it is trivial to convert between single-ended and double-ended vectors, single ended vectors stored at the system may be interpreted for use as double-ended vectors with there being no explicit conversion step being performed.

In the examples shown in the figures, the zigzag vectors are depicted as being single-ended zigzag vectors.

Zigzag vectors generated for a frame need not be exactly parallel to the vector ending in the collocated block of the other frame of the pair. It can be advantageous to select the direction of the zigzag vector in dependence on the direction of one or more neighbouring vectors of the vector which ends at the collocated block. For example, the zigzag vector processor may use an average direction (e.g. a mean direction) for the zigzag vector of a block which is calculated in dependence on the direction of the vector ending at the collocated block and the directions of one or more of its neighbouring vectors. In other examples, the directions available to a zigzag vector may be limited such that the zigzag vector processor is configured to select the closest match to the vector of the respective collocated block (e.g. a zigzag vector may be constrained to end at a particular point in a block, such as its centre).

It can be appreciated from FIGS. 13 and 14 why a zigzag vector will often represent a suitable vector candidate for a block for which conventional techniques do not provide a good vector candidate. Looking at FIG. 13, the zigzag vectors 1301 continue into regions of the frame for which good vectors cannot be generated the mapping of blocks across the current span as represented by good vectors 1105. However, zigzag vectors will not always provide a suitable vector for a block and it is therefore preferred that zigzag vectors are only used where a better alternative (e.g. as determined from a measure of similarity such as an error score) is not available.

Figure 8:
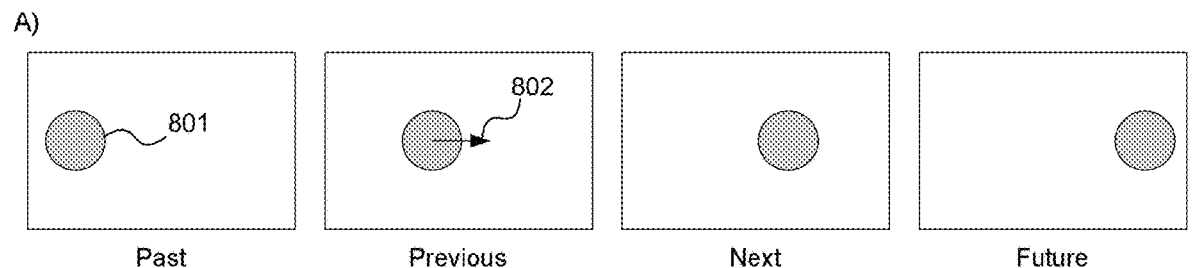
FIG. 8 illustrates the benefit of using additional source frames.
Figure 8:
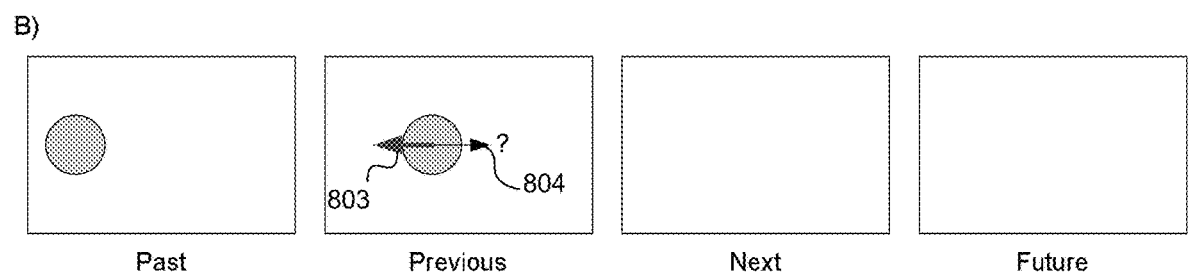
Figure 8:
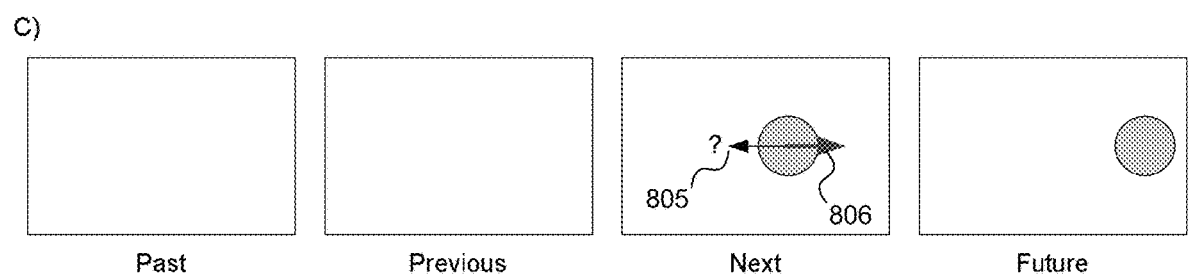
Figure 9:
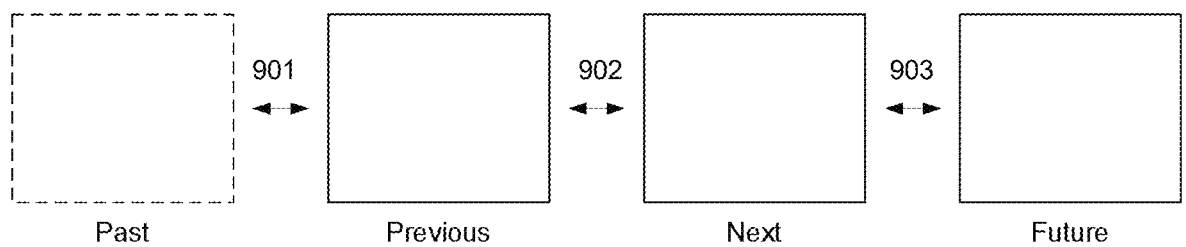
FIG. 9 is another illustration of the four frames shown in FIG. 8.

The generation of zigzag vectors in accordance with the principles described herein provides several advantages over conventional systems for generating vectors in uncertain regions of a frame, such as systems which use additional past and future frames to estimate suitable vectors (see the discussion above in relation to FIGS. 8 and 9). Generating zigzag vectors avoids the need to use additional past and future frames and allows vectors to be generated for uncertain regions of a frame from the pixel and vector information available in respect of a span between a consecutive pair of frames. This decreases the search space which is considered in order to generate a vector field for a span between frames and reduces latency since a system configured to generate zigzag vectors need not wait for a future frame (e.g. the frame following the next frame of the span). Furthermore, the generation of zigzag vectors does not substantially increase the processing performed by a motion estimation system: there is no need to test a zigzag vector against pixel data of the previous and next frames (it is known that no good pixel match would be found) and the approach makes use of vectors which have already been generated in the system. Since past and future frames are not required, and the vector field generated in respect of the span between past and previous frames is not required (see FIG. 9), the memory requirements of a motion estimation system configured to generate zigzag vectors are also substantially lower than for conventional systems.

In certain implementations, it may be possible for more than one vector to end in a collocated block (in motion estimation systems the endpoint of vectors is typically specified at sub-pixel resolution). In such cases the vector having the best measure of similarity (e.g. the lowest error score) may be selected. A measure of similarity could be calculated by the zigzag vector processor or the vector memory may be further configured to store such a measure (e.g. an error score) for each vector so as to enable the selection to be made without requiring the recalculation of the measure.

In some cases it will not be possible to generate a zigzag vector in respect of a block for which the checking logic 1220 indicates a zigzag vector is to be generated. This may occur if, for example, a collocated block in the other frame of the pair does not itself have a vector from which to generate a zigzag vector. Various techniques, as appropriate to the particular implementation of the system, are known for handling blocks for which no vector is available and it is envisaged that any such technique could be used in combination with the data processing system 1200.

In order to identify which vector ends at a collocated block it may be necessary for the zigzag vector processor to determine which of the single-ended vectors generated for the other frame of the pair end at the collocated block and/or determine which of the bidirectional vectors generated for an interpolated frame end at the collocated block. Depending on the configuration of the system and the information stored at the vector memory, this may require the zigzag vector processor to perform calculations to determine the projected endpoint of one or more single-ended or bidirectional vectors.

The zigzag vector processor may be implemented in a number of alternative ways to the example shown in FIG. 12. For example, the zigzag vector processor 1207 may be configured to generate a zigzag vector and, rather than provide it to vector memory 121, provide it to candidate buffer 1208 as a candidate for assessment at candidate assessor 1211 along with the other vector candidates of a block. The zigzag vector processor may generate a zigzag vector in respect of some or all blocks of the current span (at least for those blocks for which a zigzag vector exists). Since a zigzag vector is intended to provide a vector candidate for blocks lying in frame regions which do not have an equivalent in the other frame of the pair, a comparison of the pixel blocks at either end of a zigzag vector will not typically yield a meaningful error score. An appropriate score may therefore be selected for each zigzag vector. This allows candidate assessor 1211 to select the best vector output from the set of candidates for a block, where the set of candidates includes a zigzag vector.

A score is preferably chosen for a zigzag vector with the aim of ensuring that the zigzag vector is chosen only in situations where other vector candidates have poor error scores. This avoids a zigzag vector being chosen over another candidate which, whilst it might have a relatively poor error score, represents a genuine pixel mapping between previous and next frames. For example, a pre-defined score may be used for all zigzag vectors, an initial score may be dynamically adjusted in dependence on the characteristics of frames or vector fields of the stream of frames, or a score could be generated for the zigzag vector in dependence on the score(s) of the one or more vectors on which it is based (e.g. the zigzag vector could inherit the score of the vector on which it is based with an additional penalty value being added to prevent use of the zigzag vector unless other vector candidates have poor error scores). An appropriate predefined or initial score to apply to zigzag vectors generated at zigzag vector processor 1207 may be empirically determined so as to optimise image quality in the output of a system which uses the vector field output of data processing system 1200.

In order to produce a zigzag vector, good vectors must be available for blocks of the previous and next frames. In cases where the zigzag vector is provided as a vector candidate for assessment, the candidate assessor may be configured to operate on the candidates generated by the pixel matcher 1206 (and optionally second vector generator 1205) so as to identify good vectors, and subsequently operate on at least the best vector candidate for a block as generated by the vector generator along with the zigzag vector for the block (perhaps also along with other candidates introduced by the second vector generator 1205). This two-step approach to vector candidate assessment could be performed for some or all of the blocks of the span, or just for those blocks for which the best candidate generated by the vector generator has an error score above some predetermined level.

In all implementations, it can be advantageous to configure a zigzag vector processor such that it does not generate a zigzag vector if the vector ending in the collocated block has an error score which is above a predetermined level. This ensures that zigzag vectors are only generated based on good vectors which the system is confident represent the movement of pixels between the previous and next frames.

The data processing system 1200 may be configured to use the vector field generated for the current span and stored at vector memory 1212 in a variety of different ways. Two exemplary implementations of the data processing system for motion estimation are described below. It will often be necessary to maintain the vector field generated in respect of a pair of frames for use when processing subsequent frames (e.g. in a video encoder vector fields of a plurality of frame pairs may be used in the encoding of a single frame). The system may be configured to update the vector field maintained at the vector memory 1212 for a span to include the zigzag vectors generated for that span. This allows the zigzag vectors to be used when processing other parts of the stream of frames. Alternatively, the system may be configured not to update the vector field for the span to include the zigzag vectors and to restrict the use of those zigzag vectors to the processing of the span for which the zigzag vectors have been created. The zigzag vectors may in this case be stored in the vector memory 1212 but suitably tagged to identify them as zigzag vectors. For example, the zigzag vectors could be used in a frame rate converter to generate an interpolated frame in the current span but the vector field for that span is not updated to include the zigzag vectors. Sometimes zigzag vectors can represent poor pixel mappings and this can avoid such errors propagating over multiple spans between frame pairs.

In a first example, the data processing system is a frame rate converter and includes interpolation logic 1214 configured to use the vector field generated for a span between a pair of consecutive frames to generate one or more interpolated frames 1216 within that span. For example, interpolation logic 1214 may be configured to double the frame rate of a video stream 1201 by generating an interpolated frame halfway between every pair of consecutive frames. FIG. 13 shows such an interpolated "current frame" 1306 lying at the centre of a current span between previous and next frames. Any suitable interpolation technique may be used which forms new frames from pixel data 1215 of the previous and next frames and a vector field (held at vector memory 1212) generated for the current span in accordance with the principles described herein. The vector field generated in accordance with the principles described herein may include zigzag vectors.

Generally speaking, interpolation techniques build up an interpolated frame by identifying the vectors which pass through each block of the interpolated frame (e.g. 1307 in FIG. 13) and mapping pixels of the previous and/or next frames onto each block in accordance with those vectors which pass through that block. For example, in FIG. 13, bidirectional vector 1303 may indicate that the pixels block 1307 of the current frame 1306 are to be formed from the pixels of the previous and next frames at the endpoints of the vector. This is because vector 1303 represents a linear estimate of the movement of the pixels of the previous and next frames over the current span. Typically algorithms will be employed to blend together overlapping pixels which are mapped into the current frame by the vector field. Many other approaches to interpolation are possible.

In a second example, the data processing system is a video encoder and includes encoding logic 1217 configured to use the vector field generated for a span between a pair of consecutive frames to encode the video stream 1201 into a compressed form 1219. The vector field generated in accordance with the principles described herein may include zigzag vectors. For example, the encoding logic may periodically replace a sequence of one or more frames of the stream with coded information derived from the vector fields stored at vector memory 1212 which describe how the pixels of reference frames immediately preceding and following the sequence of frames move over the period represented by the sequence. When provided with the preceding and following reference frames, the coded information enables the sequence of frames to be largely recreated at a decoder. As is well known in the art, algorithms may be employed to create pixels which cannot be generated from pixels present in the reference frames (e.g. from neighbouring pixels).

Different types of motion estimation can place different requirements on the vectors. In a video encoder application, for example, the requirement is typically to form the most compact representation of a frame, by using motion vectors to reference pixel data from a previous frame from the sequence. These motion vectors generally focus on providing the "closest match" to a block of pixel data (or the lowest residual error), and while the resulting motion vectors are usually representative of the actual motion of objects in the scene, there is no requirement that this is always the case. In other applications, such as de-interlacing or frame rate conversion, where objects in the frame are interpolated at intermediate positions between their locations in the source frames, it is more important that the motion vectors represent the "true motion" of objects in the scene, even if other distortions in the video mean that those vectors do not always give the closest match (or lowest residual error) between blocks of pixel data. By applying appropriate constraints to the candidate motion vectors during motion search, the results can be guided towards "closest match" or "true motion" as necessary.

Figure 15:
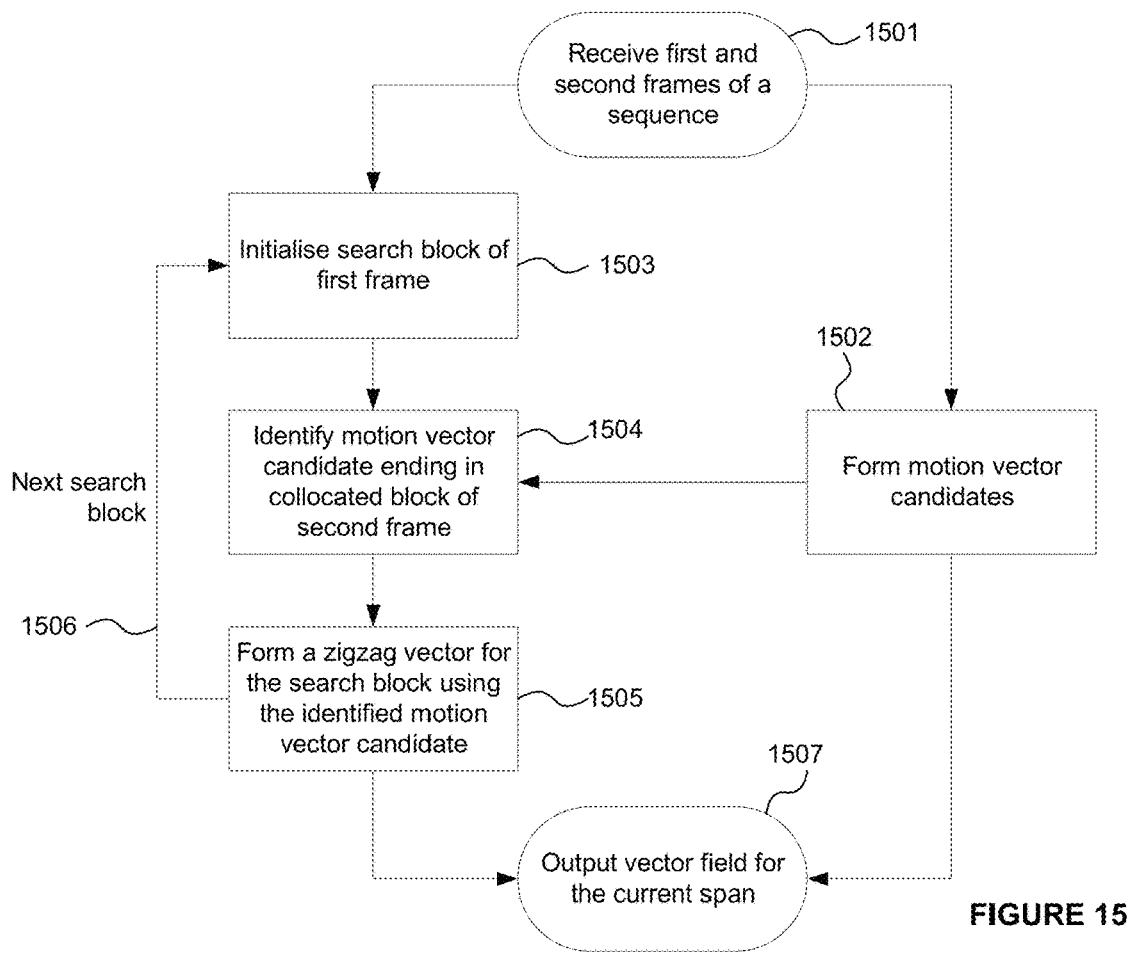
FIG. 15 is a flowchart illustrating a method for performing motion estimation in a sequence of frames.

A flowchart illustrating a method for performing motion estimation in a sequence of frames according to the principles described herein is shown in FIG. 15. Such a method might be performed by data processing system 1200 above. Initially, first and second frames are received 1501 which define a current span in respect of which motion estimation is to be performed so as to generate a vector field describing the movement of pixels between the first and second frames. Motion vector candidates are formed 1502 for the current span according to any suitable technique for identifying possible mappings of pixels between frames. The motion vector candidates may be single-ended or double-ended vectors.

Subsequently or concurrently to the formation of motion vector candidates, a search block of the first frame is initialised 1503. This may be performed in response to no good motion vector candidate being identified for that search block. In the manner described above in relation to FIGS. 13 and 14, a motion vector candidate having an endpoint in the block of the second frame which is collocated with the search block of the first frame is then identified 1504 and an output zigzag vector formed 1505 which is substantially parallel to the identified motion vector candidate. The zigzag vector represents a pixel mapping from the search block into the second frame. The zigzag vector may be a single-ended vector originating at the search block or a double-ended vector originating at a block of an interpolated frame between the first and second frames.

The process represented by steps 1503-1505 may be repeated 1506 over further search blocks of the first frame so as to generate additional zigzag vectors. Motion vector candidates formed at step 1502 and zigzag vectors formed at step 1505 represent an output vector field 1507 for the current span between the first and second frames which can be used to, for example, generate one or more interpolated frames within the current span. The first frame may precede or follow the second frame in the sequence and it will be appreciated that the roles of the first and second frames may be reversed so as to form zigzag vectors representing pixel mappings from the second frame into the first frame.

It is envisaged that the techniques described herein may be used with motion vectors of any kind which describe the mapping of groups of pixels within a sequence of two or more frames, including single-ended and double-ended vectors. In the examples described herein, block-based motion estimation is performed. Other forms of motion estimation are possible for which zigzag vectors may be generated in accordance with the described principles. A block may refer to any contiguous group of one or more pixels, the group of pixels having any shape. As is known in the art, different frames may have different blocks defined for them. Blocks need not be of constant size or shape within a frame or over time between frames; block size and/or shape may be adapted based on the characteristics of the stream of frames.

A frame may be any kind of image information represented or interpreted as a set of pixels. A stream of frames could be a sequence of frames from any source, including: a video; a sequence of still images, such as a sequence of photographs from camera operated in burst mode; a rendered sequence of images or images representing a rendered 3D scene. A sequence of frames may or may not be in temporal order. For example, a sequence of frames may be ordered according to some basis other than time: e.g. a set of frames could be ordered according to a measure of their overall similarity, or a set of images could be ordered according to the position from which each image is captured.

The data processing system of FIG. 12 is shown as comprising a number of functional blocks. This is schematic only and is not intended to define a strict division between different logic elements of a data processing system. Each functional block may be provided in any suitable manner.

A data processing system configured in accordance with the principles described herein may be embodied in hardware (e.g. as an integrated circuit with the processing being performed at binary logic) and/or software (e.g. as a set of routines running at a processor such as a graphics processing unit (GPU) or central processing unit (CPU) with access to one or more memories for storing pixel data, motion vector data and other values).

The terms software, program code and computer-readable code encompass executable code for processors (e.g. CPUs and/or GPUs), firmware, bytecode, programming language code such as C or OpenCL, and modules for reconfigurable logic devices such as FPGAs. Computer-readable code further includes code defining representations of integrated circuits at any level, including at register transfer level (RTL), at high-level circuit representations such as Verilog or VHDL, and lower-level representations such as OASIS and GDSII. When executed at a computer system configured for generating a representation of an integrated circuit in hardware, such code defining representations of integrated circuits may cause such a computer system to generate the integrated circuit as defined in the code. The code may include definitions of circuit elements and/or rules for combining circuit elements. Some or all of the rules for combining the defined circuit elements may be provided at the computer system as default rules for generating a representation of an integrated circuit in hardware from such computer-readable code.

The algorithms and methods described herein could be performed by one or more physical processing units executing software that causes the unit(s) to perform the algorithms/methods. The or each physical processing unit could be any suitable processor, such as a CPU or GPU (or a core thereof), or fixed function or programmable hardware. Machine-readable code could be stored in non-transitory form at a machine readable medium such as an integrated circuit memory, or optical or magnetic storage. A machine readable medium might comprise several memories, such as on-chip memories, computer working memories, and non-volatile storage devices.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A data processing system for performing motion estimation in a sequence of frames comprising first and second frames each divided into respective sets of blocks of pixels, the system comprising:
   a vector generator configured to form motion vector candidates each representing motion of a block of pixels between the first and second frames; and
   a vector processor configured to, if no motion vector candidates are available for a search block of the first frame, identify a first motion vector candidate ending in a block of the second frame collocated with the search block and form an output vector for the search block which is substantially parallel to the first motion vector candidate and represents a mapping of pixels from the search block to the second frame.

2. A data processing system as claimed in claim 1, further comprising a candidate assessor configured to calculate a score for each motion vector candidate formed by the vector generator, each score being a measure of the similarity of the pixels in the first and second frames at each end of the respective motion vector candidate, the candidate assessor being configured to cause the vector processor to form the output vector for the search block if:
   the score of each motion vector candidate available for the search block is indicative of a low similarity between the pixels at the endpoints of that motion vector candidate; or
   no motion vector candidates are available for the search block.

3. A data processing system as claimed in claim 2, wherein the candidate assessor is configured to, if at least one motion vector candidate is available for the search block having a score indicative of a high similarity between the pixels at its endpoints, provide for use as a vector describing the mapping of pixels from the search block to the second frame the motion vector candidate having a score indicative of greatest similarity between its endpoint pixels.

4. A data processing system as claimed in claim 1, further comprising a candidate assessor configured to calculate a score for each motion vector candidate formed by the vector generator, each score being a measure of the similarity of the pixels in the first and second frames at each end of the respective motion vector candidate, wherein the vector processor is configured to add the output vector for the search block to any motion vector candidates available for the search block and the data processing system being configured to use as a vector describing the mapping of pixels from the search block to the second frame the vector having a score indicative of greatest similarity between its endpoint pixels, the output vector being assigned a predefined score or a score formed in dependence on the score of the first motion vector candidate.

5. A data processing system as claimed in claim 4, wherein the vector processor is configured to process each block of the first frame as a search block to, in each case that a motion vector candidate ends in a respective collocated block of the second frame, form an output vector for that block of the first frame.

6. A data processing system as claimed in claim 1, wherein the motion vector candidates include single-ended vectors originating at blocks of the first and/or second frames.

7. A data processing system as claimed in claim 1, wherein the motion vector candidates include double-ended vectors originating at blocks of an interpolated frame between the first and second frames.

8. A data processing system as claimed in claim 1, wherein the vector processor is configured to identify the collocated block of the second frame as a block of the second frame which is located at a frame position corresponding to the search block of the first frame.

9. A data processing system as claimed in claim 1, wherein the motion vector candidates include single-ended motion vector candidates and the vector generator is configured to form a single-ended motion vector candidate for a block of the second frame by identifying an area of pixels in the first frame which most closely matches the pixels of the block of the second frame, and/or to form a single-ended motion vector candidate for a block of the first frame by identifying an area of pixels in the second frame which most closely matches the pixels of the block of the first frame.

10. A data processing system as claimed in claim 1, wherein the motion vector candidates include double-ended motion vector candidates and the vector generator is configured to form a double-ended motion vector candidate for a block of an interpolated frame between the first and second frames by identifying matching areas of pixels in the first and second frames, the areas of pixels in the first and second frames having a predefined relationship to the block of the interpolated frame.

11. A data processing system as claimed in claim 1, wherein the vector processor is configured to form the output vector using pixel data from the first and second frames only.

12. A data processing system as claimed in claim 1, wherein the vector processor is configured to form the output vector using only motion vector candidates generated between the first and second frames.

13. A data processing system as claimed in claim 1, wherein the vector processor is further configured to determine the direction of the output vector in dependence on the directions of one or more motion vector candidates ending in blocks neighbouring the collocated block of the second frame.

14. A data processing system as claimed in claim 1, wherein the output vector is a single-ended vector originating at the search block of the first frame.

15. A data processing system as claimed in claim 1, wherein the output vector is a double-ended vector originating at a block of an interpolated frame between the first and second frames and having an endpoint at the search block of the first frame.

16. A data processing system as claimed in claim 1, further comprising interpolation logic configured to operate the output vector on pixels of the search block to generate a block of an interpolated frame between the first and second frames.

17. A data processing system as claimed in claim 1, further comprising encoding logic configured to use the output vector in the generation of an encoded video stream.

18. A method for performing motion estimation in a sequence of frames, the sequence comprising first and second frames each divided into respective sets of blocks of pixels, the method comprising:
   forming motion vector candidates each representing the motion of a block of pixels between the first and second frames;
   and for a search block of the first frame, if no motion vector candidates are available for that search block:
      identifying a first motion vector candidate ending in a block of the second frame collocated with the search block of the first frame; and
      forming an output vector for the search block which is substantially parallel to the first motion vector candidate and represents a mapping of pixels from the search block to the second frame.

19. A non-transitory computer readable storage medium having stored thereon computer readable instructions that, when executed at a processor, cause the processor to implement the method of performing motion estimation in a sequence of frames, the sequence comprising first and second frames each divided into respective sets of blocks of pixels, the method comprising:
   forming motion vector candidates each representing the motion of a block of pixels between the first and second frames;
   and for a search block of the first frame, if no motion vector candidates are available for that search block:
      identifying a first motion vector candidate ending in a block of the second frame collocated with the search block of the first frame; and
      forming an output vector for the search block which is substantially parallel to the first motion vector candidate and represents a mapping of pixels from the search block to the second frame.

* * * * *